United States Patent
Balasubramanian (10) Patent No.: US 6,633,942 B1
(45) Date of Patent: Oct. 14, 2003

(54) DISTRIBUTED REAL-TIME OPERATING SYSTEM PROVIDING INTEGRATED INTERRUPT MANAGEMENT

(75) Inventor: Sivaram Balasubramanian, Mayfield Heights, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 09/408,670

(22) Filed: Sep. 30, 1999

Related U.S. Application Data (60) Provisional application No. 60/148,541, filed on Aug. 12, 1999.

(51) Int. Cl.[7] .............................................. G06F 13/26
(52) U.S. Cl. ....................... 710/264; 710/262; 709/100; 709/103
(58) Field of Search .................. 710/260, 261, 710/262, 263, 264, 265, 266, 267, 268, 269; 709/100, 102, 103, 104, 105, 107, 108, 1; 713/502, 600, 601

(56) References Cited

U.S. PATENT DOCUMENTS

| | | | | |
|---|---|---|---|---|
| 5,012,409 A | * | 4/1991 | Fletcher et al. ............. | 709/103 |
| 5,081,577 A | * | 1/1992 | Hatle .......................... | 710/7 |
| 5,297,275 A | * | 3/1994 | Thayer ....................... | 713/500 |
| 5,528,513 A | * | 6/1996 | Vaitzblit et al. ............ | 709/103 |
| 5,542,076 A | * | 7/1996 | Benson et al. ............... | 710/260 |
| 5,560,018 A | * | 9/1996 | Macon et al. ................ | 710/260 |
| 5,560,019 A | * | 9/1996 | Narad .......................... | 710/260 |
| 5,640,563 A | * | 6/1997 | Carmon ....................... | 709/102 |
| 5,659,759 A | * | 8/1997 | Yamada ....................... | 710/265 |
| 5,768,599 A | * | 6/1998 | Yokomizo ................... | 710/260 |
| 5,797,019 A | * | 8/1998 | Levine et al. ............... | 710/262 |
| 5,937,199 A | * | 8/1999 | Temple ........................ | 710/262 |
| 6,085,215 A | * | 7/2000 | Ramakrishnan et al. .... | 709/102 |
| 6,092,095 A | * | 7/2000 | Maytal ......................... | 709/100 |
| 6,209,086 B1 | * | 3/2001 | Chi et al. .................... | 712/244 |
| 6,430,594 B1 | * | 8/2002 | Akiyama et al. ........... | 709/108 |

\* cited by examiner

*Primary Examiner*—Sumati Lefkowitz
*Assistant Examiner*—X. Chung-Trans
(74) *Attorney, Agent, or Firm*—Quarles & Brady; Alexander M. Gerasimow; William R. Walbrun (57) ABSTRACT

An interrupt handler is provided for a real-time control system that prevents interrupts which occur asynchronously with respect to control tasks from upsetting guarantees of timely execution of the control tasks. For interrupts associated with the communication of messages between portions of a control task over the distributed system, the interrupts are converted to proxy tasks that may be scheduled like any task in a multitasked-operated system. More generally, interrupts may be assigned to a predetermined interrupt window being a portion of the total processing bandwidth of the processor. In pre-allocating the processor bandwidth to the control tasks, this interrupt window may be subtracted out thereby guaranteeing adequate bandwidth for both interrupt processing and user tasks.

11 Claims, 6 Drawing Sheets

DISTRIBUTED REAL-TIME OPERATING SYSTEM PROVIDING INTEGRATED INTERRUPT MANAGEMENT

CROSS-REFERENCE TO RELATED APPLICATIONS

This application claims the benefit of provisional application Ser. No. 60/148,541 filed Aug. 12, 1999.

STATEMENT REGARDING FEDERALLY SPONSORED RESEARCH OR DEVELOPMENT

BACKGROUND OF THE INVENTION

The present invention relates to industrial controllers for controlling industrial processes and equipment, and more generally to an operating system suitable for a distributed industrial control system having multiple processing nodes spatially separated about a factory or the like.

Industrial controllers are special purpose computers used for controlling industrial processes and manufacturing equipment. Under the direction of a stored control program the industrial controller examines a series of inputs reflecting the status of the controlled process and in response, adjusts a series of outputs controlling the industrial process. The inputs and outputs may be binary, that is on or off, or analog providing a value within a continuous range of values.

Centralized industrial controllers may receive electrical inputs from the controlled process through remote input/output (I/O) modules communicating with the industrial controller over a high-speed communication network. Outputs generated by the industrial controller are likewise transmitted over the network to the I/O circuits to be communicated to the controlled equipment. The network provides a simplified means of communicating signals over a factory environment without multiple wires and the attendant cost of installation.

Effective real-time control is provided by executing the control program repeatedly in high speed "scan" cycles. During each scan cycle each input is read and new outputs are computed. Together with the high-speed communications network, this ensures the response of the control program to changes in the inputs and its generation of outputs will be rapid. All information is dealt with centrally by a well-characterized processor and communicated over a known communication network to yield predictable delay times critical to deterministic control.

The centralized industrial controller architecture, however, is not readily scalable, and with foreseeably large and complex control problems, unacceptable delays will result from the large amount of data that must be communicated to a central location and from the demands placed on the centralized processor. For this reason, it may be desirable to adopt a distributed control architecture in which multiple processors perform portions of the control program at spatially separate locations about the factory. By distributing the control, multiple processors may be brought to bear on the control problem reducing the burden on any individual processor and the amount of input and output data that must be transmitted.

Unfortunately, the distributed control model is not as well characterized as far as guaranteeing performance as is required for real-time control. Delay in the execution of a portion of the control program by one processor can be fatal to successful real-time execution of the control program, and because the demand for individual processor resources fluctuates, the potential for an unexpected overloading of a single processor is possible. This is particularly true when a number of different and independent application programs are executed on the distributed controller and where the application programs compete for the same set of physical hardware resources.

One problem in ensuring timely execution of tasks in a distributed environment arises in the processing of interrupts. Interrupts are electrical signals acting directly on the hardware of the processor to cause the processor to stop its current execution of a program and respond, typically, to an external device requiring immediate attention. Interrupts avoid inefficient polling by the processor of asynchronous signals and thus greatly improve the efficiency of some types of processing. Implicitly, interrupts normally have the highest priority with respect to response by the processor. A distributed control system with its attendant increased need for intercommunication among disparate components, may make extensive use of interrupts.

Unfortunately, because interrupts occur asynchronously to the execution of task on the processor, there exists the possibility that a large number of interrupts will occur within a small window of time thus preventing the timely execution of the task which is being interrupted. When the interrupts are caused by low priority tasks, the effects of this is a priority inversion where lower priority tasks displace higher priority tasks. This may lead to the failure of time critical tasks.

SUMMARY OF THE INVENTION

The present invention provides two methods of managing interrupts in the context of a real-time control system where task execution must proceed according to guaranteed completion times. For those interrupts associated with incoming messages and remote services provided by the operating system, the interrupts are embedded into a proxy task which is scheduled along with other tasks executed by a multitasking operating system. The proxy task may pre-empt the current task or may wait its turn depending on its priority.

All interrupts, are allocated to an interrupt window being a fixed percentage of time of the processor bandwidth. If interrupt window time is available, the interrupt is processed. Nested interrupting is allowed providing for a high degree of responsiveness of the control system. The interrupt window is subtracted from the of bandwidth of the processor that may be allocated in pre-allocation of bandwidth to application programs. Accordingly, guarantees of timely execution of programs having pre-allocated bandwidth may be ensured despite asynchronous interrupts such as may occur during run time.

Specifically, the present invention provides an interrupt manager for use with a processor forming part of a distributed control system. The interrupt manager includes interrupt reception circuitry receiving interrupt signals including a current interrupt. An interrupt window counter stores a value indicating the time remaining in a current window for the service of interrupts. The interrupt window counter is reset by a window timer at the expiration of each window period. A masking circuit masks current interrupts when the current interrupt would cause the value of the interrupt window counter to exceed the pre-allocated interrupt period.

Thus, it is one object of the invention to limit the servicing of interrupts to a finite period within each processing window. In this way, an arbitrary confluence of interrupts will not upset the deterministic execution of control tasks that must adhere to deadlines. The interrupt manager may mask interrupts until the determination is made as to whether the current interrupt may be executed.

Thus, it is another object of the invention to allow the initial evaluation of an interrupt to proceed without further interruptions.

The interrupt manager may determine whether the current interrupt may be processed by adding an estimate of the time for processing the current value of the interrupt window counter. The estimation may be modified during actual execution of the interrupt.

Upon the determination that the current interrupt may be executed within the interrupt window, the interrupts are unmasked.

It is yet another object of the invention to permit nested interrupts such as provides for responsive operation of the interrupt process.

Thus, it is another object of the invention to provide for simple before-the-fact determination of whether an interrupt can proceed by allowing the use of a conservative estimate that is refined during run time.

It is yet another object of the invention to allow for the processing of subsequent nested interrupts by pre-estimating the amount of time required by each interrupt as it is received. In this way, nested interrupts may be accepted prior to an initial interrupt being completed.

Upon completion of the interrupt, the interrupt manager may add the estimate of the interrupt processing time and subtract the actual interrupt processing time from the value of the interrupt window counter.

Thus, it is another object of the invention to provide accurate accounting of actual interrupt time used while allowing pre-allocation of the interrupt time window.

The interrupt manager may cease masking the current interrupt upon resetting of the interrupt window counter by the timer.

It is, therefore, another object of the invention to allow stalled interrupts to nevertheless execute in order.

The interrupt manager may include a resource allocating operating system pre-allocating portions of the window period, excluding the predetermined interrupt window, to multiple tasks to be executed on the processor so as to guarantee timely execution of those tasks.

Thus, it is another object of the invention to allow pre-allocation of hardware resources to particular control tasks while guaranteeing interrupts will not usurp that allocation.

For the communication circuit in which the interrupts are related to incoming messages, the interrupt manager may include a task scheduler receiving tasks and arranging them in a queue according to priorities for execution by the processor. The communication circuit may receive messages having priorities to generate a communication interrupt. An interrupt reception circuit may receive the communication interrupts and the priorities and generate corresponding proxy tasks having the priority and enroll the proxy task on the task scheduler queue.

Thus, it is another object of the invention to provide a mechanism for processing interrupts for communication devices when messages form connections between tasks executed on spatially separate hardware making use of the same scheduling framework as the rest of the tasks thereby guaranteeing timely execution of the task as is necessary for real-time control.

The task scheduler may consider both the priority and time constraint value.

Thus, it is another object of the invention to provide for a mixed priority scheduling of interrupts through the use of a proxy task.

The foregoing and other objects and advantages of the invention will appear from the following description. In the description, reference is made to the accompanying drawings which form a part hereof and in which there is shown by way of illustration a preferred embodiment of the invention. Such embodiment does not necessarily represent the full scope of the invention, however, and reference must be made to the claims herein for interpreting the scope of the invention.

DETAILED DESCRIPTION OF THE INVENTION

Distributed Control System

Figure 1:
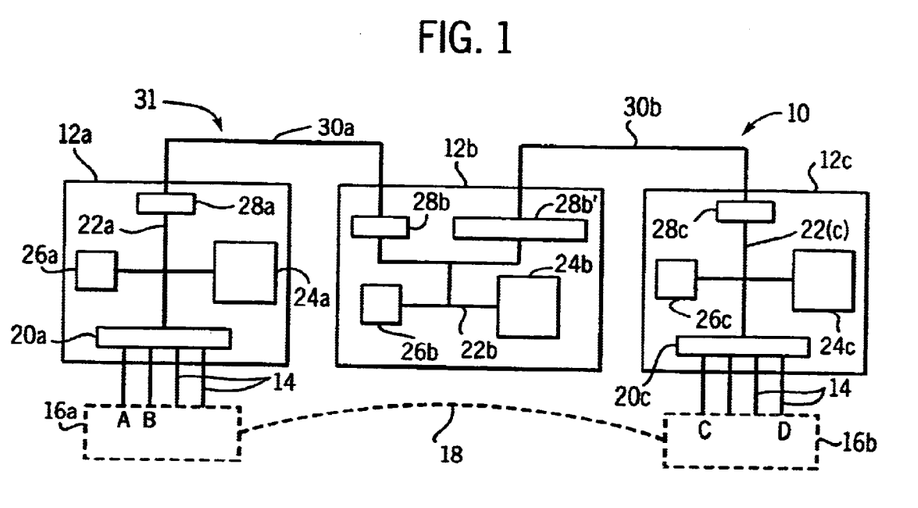
FIG. 1 is a simplified diagram of a distributed control system employing two end nodes and an intervening communication node and showing the processor, memory and communication resources for each node.

Referring now to FIG. 1, a distributed control system 10 includes multiple nodes 12a, 12b and 12c for executing a control program comprised of multiple applications. Control end nodes 12a and 12c include signal lines 14 communicating between the end nodes 12a and 12c and a portion of a controlled process 16a and 16b. Controlled process portions 16a and 16b may communicate by a physical process flow or other paths of communication indicated generally as dotted line 18.

In the present example, end node 12a may receive signals A and B from process 16a, and end node 12c may receive signal C from process 16b and provide as an output signal D to process 16b as part of a generalized control strategy.

End nodes 12a and 12c include interface circuitry 20a and 20c, respectively, communicating signals on signal lines 14 to internal buses 22a and 22c, respectively. The internal buses 22a and 22c may communicate with the hardware resources of memory 24a, processor 26a and communication card 28a (for end node 12a) and memory 24c, processor 26c, and network communication card 28c for end node 12c. Communication card 28a may communicate via network media 30a to a communication card 28b on node 12b which may communicate via internal bus 22b to memory 24b and processor 26b and to second network communication card 28b connected to media 30b which in turn communicates with communication card 28c.

Generally during operation of distributed control system application programs are allocated between memories 24a, 24b and 24c to be executed on the respective nodes 12a, 12b and 12c with communications as necessary over links 30a and 30b. In an example control task, it may be desired to produce signal D upon the logical conjunction of signals A, B and C. In such a control task, a program in memory 24a would monitor signals A and B and send a message indicating both were true, or in this example send a message indicating the state of signals A and B to node 12c via a path through communication 28a, 28b, 28b' and 28c.

A portion of the application program executed by processor 26c residing in memory 24c would detect the state of input C and compare it with the state of signals A and B in the received message to produce output signal D.

The proper execution of this simple distributed application program requires not only the allocation of the application program portions to the necessary nodes 12a, 12b and 12c, but prompt and reliable execution of those programs, the latter which requires the hardware resources of memory, processor, and communication networks 28a, 30a, 28b, 28b' 30b and 28c.

Figure 2:
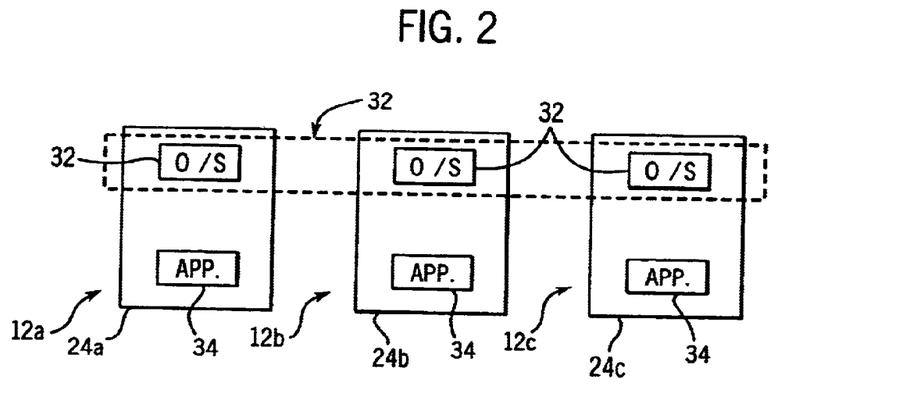
FIG. 2 is a block diagram showing the memory resources of each node of FIG. 1 as allocated to a distributed real-time operating system and different application programs.

Referring now to FIG. 2 for this latter purpose, the distributed real-time operating system 32 of the present invention may be used such as may be centrally located in one node 12 or in keeping with the distributed nature of the control system distributed among the nodes 12a, 12b and 12c. In the latter case, the portions of the operating system 32 are stored in each of the memories 24a, 24b and 24c and intercommunicate to operate as a single system. In the preferred embodiment, a portion of the operating system 32 that provides a modeling of the hardware resources (as will be described) is located in the particular node 12a, 12b and 12c associated with those hardware resources. Thus, hardware resource of memory 24a in node 12a would be modeled by a portion of the operating system 32 held in memory 24a.

In addition to portions of the operating system 32, memory 24a, 24b and 24c include various application programs 34 or portions of those application programs 34 as may be allocated to their respective nodes.

Integrated Resource Management

Figure 3:
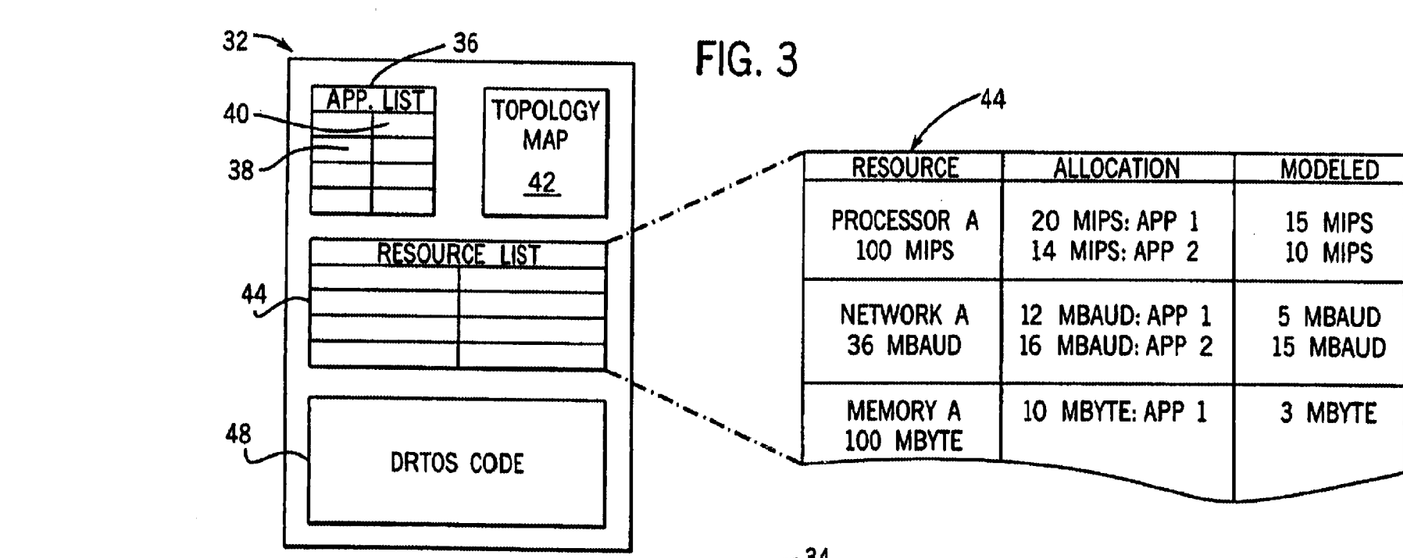
FIG. 3 is an expanded block diagram of the distributed operating system of FIG. 2 such as includes an application list listing application programs to be executed by the distributed control system, a topology showing the topology of the connection of the hardware resources of the nodes of FIG. 1, a resource list detailing the allocation of the hardware resources to the application program and the statistics of their use by each of the application programs, and the executable distributed real-time operating system code.

Referring now to FIG. 3, the operating system 32 collectively provides a number of resources for ensuring proper operation of the distributed control system 10. First, an application list 36 lists the application programs 34 that have been accepted for execution by the distributed control system 10. Contained in the application list 36 are application identifiers 38 and high-level requirements 40 of the application programs as will be described below.

A hardware resource list 44 provides (as depicted in a first column) a comprehensive listing of each hardware resource of the distributed control system 10 indicating a quantitative measure of that resource. For example, for the principle hardware resources of processors 26, networks 31 and memories 24, quantitative measurements may be provided in terms of millions of instructions per second (MIPs) for processors 26, numbers of megabytes for memories 24 and megabaud bandwidth for networks. While these are the principal hardware resources and their measures, it will be understood that other hardware resources may also be enrolled in this first column and other units of measures may be used. Generally, the measures are of "bandwidth", a term encompassing both an indication of the amount of data and the frequency of occurrence of the data that must be processed.

A second column of the hardware resource list 44 provides an allocation of the quantitative measure of the resource of a particular row to one or more application programs from the application list 36 identified by an application name. The application name may match the application identifier 38 of the application list 36 and the indicated allocation quantitative measure will typically be a portion of the quantitative measure of the first column.

A third column of the hardware resource list 44 provides an actual usage of the hardware resource by the application program as may be obtained by collecting statistics during running of the application programs. This measure will be statistical in nature and may be given in the units of the quantitative measure for the hardware resource provided in the first column.

The operating system 32 also includes a topology map 42 indicating the connection of the nodes 12a, 12b and 12c through the network 31 and the location of the hardware resources of the hardware resource list 44 in that topology.

Finally, the operating system also includes an operating system code 48 such as may read the application list 36, the topology map 42, and the hardware resource list 44 to ensure proper operation of the distributed control system 10.

Figure 4:
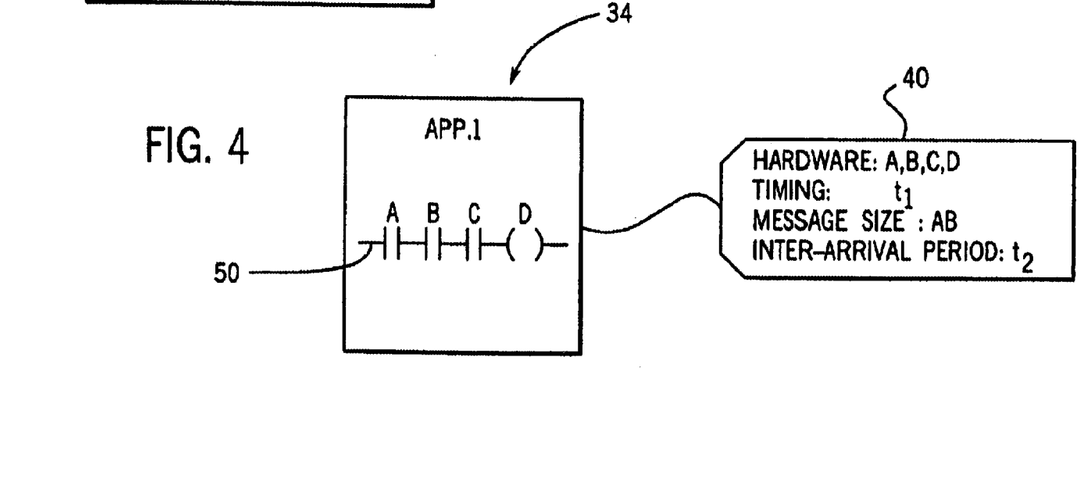
FIG. 4 is a pictorial representation of a simplified application program attached to its high-level requirements.

Referring now to FIG. 4, each application program enrolled in the application list 36 is associated with high-level requirements 40 which will be used by the operating system code 48. Generally, these high-level requirements 40 will be determined by the programmer based on the programmer's knowledge of the controlled process 16 and its requirements.

Thus, for the application described above with respect to FIG. 1, the application program 34 may include a single ladder rung 50 (shown in FIG. 4) providing for the logical ANDing of inputs A, B and C to produce an output D. The high-level requirements 40 would include hardware requirements for inputs and outputs A, B, C and D. The high-level requirements 40 may further include "completion-timing constraints" $t_1$ and indicating a constraint in execution time of the application program 34 needed for real-time control. Generally the completion-timing constraint is a maximum period of time that may elapse between occurrences of the last of inputs A, B and C to become logically true and the occurrence of the output signal D.

The high-level requirements 40 may also include a message size, in this case the size of a message AB which must be sent over the network 31, or this may be deduced automatically through use of the topology map 42 and an implicit allocation of the hardware.

Finally, the high-level requirements 40 include an "inter-arrival period" $t_2$ reflecting an assumption about the statistics of the controlled process 16a in demanding execution of the application program 34. As a practical matter the inter-arrival period $t_2$ need be no greater than the scanning period of the input circuitry 20a and 20c which may be less than the possible bandwidth of the signals A, B and C but which will provide acceptable real-time response.

Figure 5:
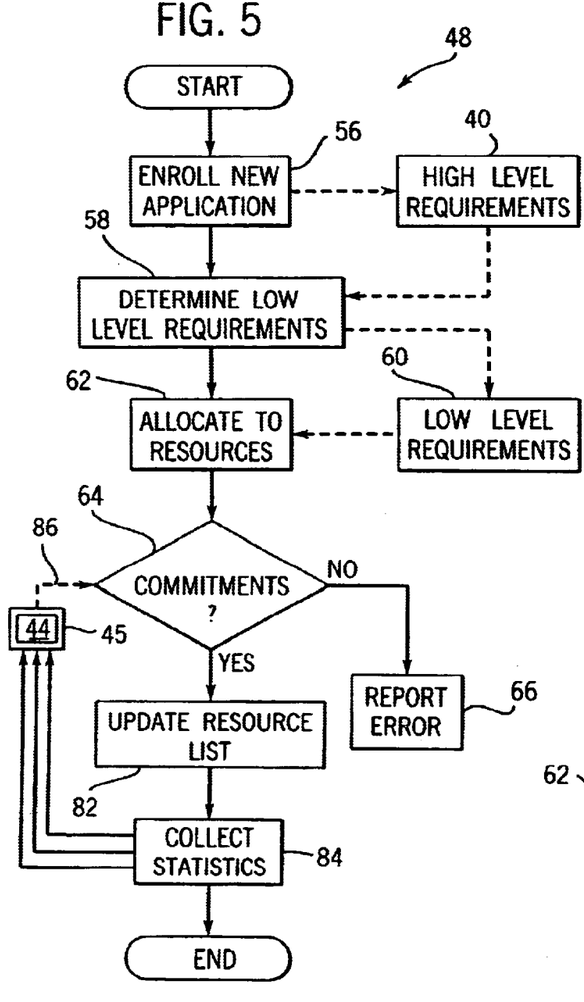
FIG. 5 is a flow chart of the operation of the distributed real-time operating system code of FIG. 3 showing steps upon accepting a new application program to determine the low-level hardware resource requirements and to seek commitments from those hardware resources for the requirements of the new application program.

Referring now to FIG. 5, the operating system code 48 ensures proper operation of the distributed control system 10 by checking that each new enrolled application program 34 will operate acceptably with the available hardware resources. Prior to any new application program 34 being added to the application list 36, the operating system code 48 intervenes so as to ensure the necessary hardware resources are available and to ensure that time guarantees may be provided for execution of the application program.

At process block 56, the operating system code 48 checks that the high-level requirements 40 have been identified for the application program. This identification may read a prepared file of the high-level requirements 40 or may solicit the programmer to input the necessary information about the high-level requirements 40 through a menu structure or the like, or may be semiautomatic involving a review of the application program 34 for its use of hardware resources and the like. As shown and described above with respect to FIG. 4, principally four high-level requirements are anticipated that of hardware requirements, completion-timing constraints, message sizes, and the inter-arrival period. Other high-level requirements are possible including the need for remote system services, the type of priority of the application, etc.

Referring still to FIG. 5, as indicated by process block 58, the high-level requirements 40 are used to determine low-level requirements 60. These low-level requirements may be generally "bandwidths" of particular hardware components such as are listed in the first column of the hardware resource list 44. Generally, the low-level requirements will be a simple function of high-level requirements 40 and the objective characteristics of the application program 34, the function depending on a priori knowledge about the hardware resource. For example, the amount of memory will be a function of the application program size whereas, the network bandwidth will be a function of the message size and the inter-arrival period $t_2$, and the processor bandwidth will be a function of the application program size and the inter-arrival period $t_2$ as will be evident to those of ordinary skill in the art. As will be seen, it is not necessary that the computation of the low-level requirements 60 be precise so long as it is a conservative estimate of low-level resources required.

The distinction between high-level requirements 40 and low-level requirements 60 is not fixed and in fact some high-level requirements, for example message size, may in fact be treated as low-level requirements as deduced from the topology map 42 as has been described.

Figure 6:
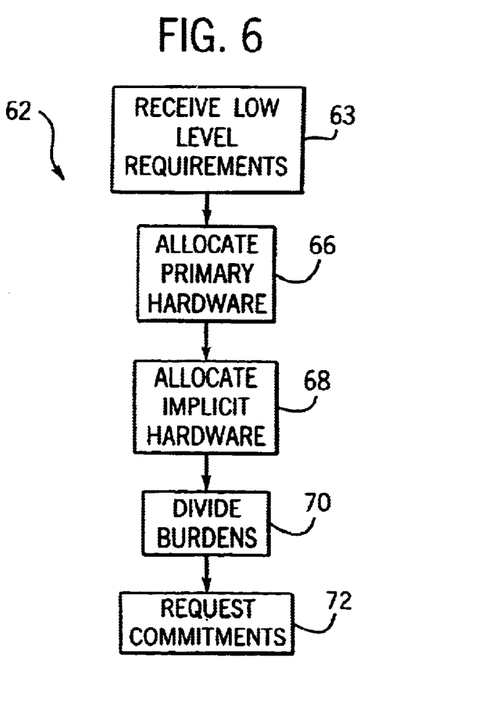
FIG. 6 is a detailed version of the flow chart of FIG. 5 showing the process of allocating low-level requirements to hardware resources.

Once the low-level requirements 60 have been determined at process block 62, they are allocated to particular hardware elements distributed in the control system 10. Referring also to FIG. 6, the process block 62 includes sub-process block 63 where the low-level requirements abstracted at process block 58 are received. At process block 66, end nodes 12a and 12c are identified based on their hardware links to inputs A, B and C and output D and a tentative allocation of the application program 34 to those nodes and an allocation of necessary processor bandwidth is made to these principal nodes 12a and 12c. Next at process block 68 with reference to the topology map 42, the intermediary node 12b is identified together with the necessary network 31 and an allocation is made of network space based on message size and the inter-arrival period.

The burden of storing and executing the application program is then divided at process block 70 allocating to each of memories 24a and 24c (and possibly 12b), a certain amount of space for the application program 34 and to processors 26a and 26c (and possibly 26b) a certain amount of their bandwidth for the execution of the portions of the application program 34 based on the size of the application program 34 and the inter-arrival period $t_2$. Network cards 28a, 28b', 28b and 28c also have allocations to them based on the message size and the inter-arrival period $t_2$. Thus, generally the allocation of the application program 34 can include intermediate nodes 12b serving as bridges and routers where no computation will take place. For this reason, instances or portions of the operating system code 48 will also be associated with each of these implicit hardware resources.

There are a large number of different allocative mechanisms, however, in the preferred embodiment the application program is divided according to the nodes associated with its inputs per U.S. Pat. No. 5,896,289 to Struger issued Apr. 20, 1999 and entitled: "Output Weighted Partitioning Method for a Control Program in a Highly Distributed Control System" assigned to the same assignee as the present invention and hereby incorporated by reference.

During this allocation of the application program 34, the completion-timing constraint $t_1$ for the application program 34 is divided among the primary hardware to which the application program 34 is allocated and the implicit hardware used to provide for communication between the possibly separated portions of the application program 34. Thus, if the completion-timing constraint $t_1$ is nine milliseconds, a guaranty of time to produce an output after necessary input signals are received, then each node 12a–c will receive three microseconds of that allocation as a time obligation.

At process block 72, a request for a commitment based on this allocation including the allocated time obligations and other low-level requirements 60 is made to portions of the operating system code 48 associated with each hardware element.

At decision block 64, portions of the operating system code 48 associated with each node 12a–c and their hardware resources review the resources requested of them in processor, network, and memory bandwidth and the allocated time obligations and reports back as to whether those commitments may be made keeping within the allocated time obligation. If not, an error is reported at process block 66. Generally, it is contemplated that code portions responsible for this determination will reside with the hardware resources which they allocate and thus may be provided with the necessary models of the hardware resources by the manufacturers.

Figure 7:
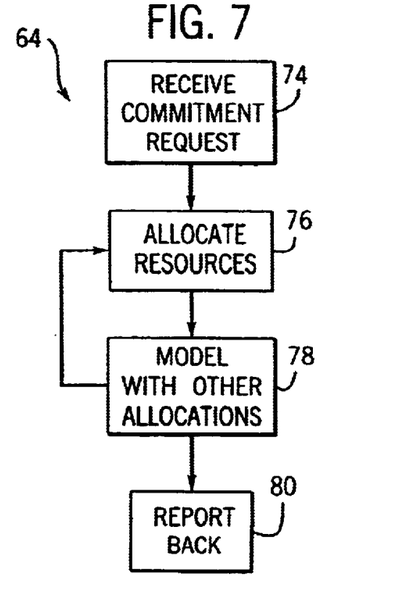
FIG. 7 is a block diagram detailing the step of the flow chart of FIG. 5 of responding to requests for commitment of hardware resources.

This commitment process is generally represented by decision block 64 and is shown in more detail in FIG. 7 having a first process block 74 where a commitment request is received designating particular hardware resources and required bandwidths. At process block 76, the portion of the operating system code 48 associated with the hardware element allocates the necessary hardware portion from hardware resource list 44 possibly modeling it as shown in process block 78 with the other allocated resources of the resource list representing previously enrolled application programs 34 to see if the allocation can be made. In the case of the static resources such as memory, the allocation may simply be a checking of the hardware resource list 44 to see if sufficient memory is available. In dynamic resources such as the processors and the network, the modeling may determine whether scheduling may be performed such as will allow the necessary completion-timing constraints $t_1$ given the inter-arrival period $t_2$ of the particular application and other applications.

At the conclusion of the modeling and resource allocation including adjustments that may be necessary from the modeling at process block 80, a report is made back to the other components of the operating system code 48. If that report is that a commitment may be had for all hardware resources of the high-level requirements 40, then the program proceeds to process block 82 instead of process block 66 representing the error condition as has been described.

At process block 82, a master hardware resource list 44 is updated and the application program is enrolled in the application list 36 to run.

During execution of the application program 34 and as indicated by process block 84, statistics are collected on its actual bandwidth usage for the particular hardware resources to which it is assigned. These are stored in the third column of the hardware resource list 44 shown in FIG. 3 and is shown in the block 45 associated with FIG. 5 and may be used to change the amount of allocation to particular application programs 34, indicated by arrow 86, so as to improve hardware resource utilization.

Scheduled Communication Queuing

Figure 8A:
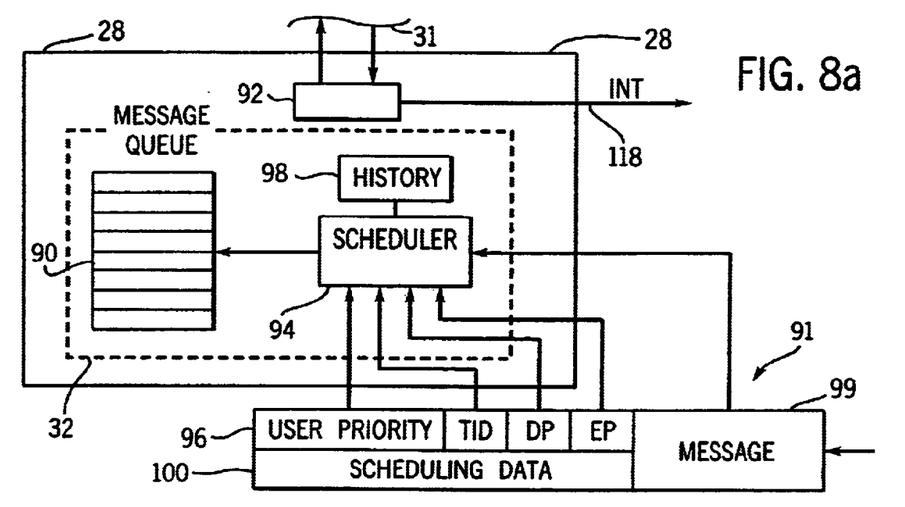
FIG. 8a is a detailed view of the communication circuit of FIG. 1 showing a messaging queue together with a scheduler and a history table as may be implemented via an operating system and showing a message received by the communication circuit over the bus of FIG. 1.

Referring now to FIG. 8a, the communication card 28 will typically include a message queue 90 into which messages 91 are placed prior to being transmitted via a receiver/transmitter 92 onto the network 31. A typical network queuing strategy of First-In-First-Out (FIFO) will introduce a variable delay in the transmission of messages caused by the amount of message traffic at any given time. Of particular importance, messages which require completion on a timely basis and which therefore have a high priority may nevertheless be queued behind lower level messages without time criticality. In such a queue 90, priority and time constraints are disregarded, therefore even if ample network bandwidth is available and suitable priority attached to messages 91 associated with control tasks, the completion timing constraints $t_1$ cannot be guaranteed.

To overcome this limitation, the communication card 28 of the present invention includes a queue-level scheduler 94 which may receive messages 91 and place them in the queue 90 in a desired order of execution that is independent of the arrival time of the message 91. The scheduler 94 receives the messages 91 and places them in the queue 90 and includes memory 98 holding a history of execution of messages identified to their tasks as will be described below. Generally the blocks of the queue 90, the scheduler 94 and the memory 98 are realized as a portion of the operating system 32, however, they may alternatively be realized as an application specific integrated circuit (ASIC) as will be understood in the art.

Each message 91 associated with an application program for which a time constraint exists (guaranteed tasks) to be transmitted by the communication card 28 will contain conventional message data 99 such as may include substantive data of the message and the routing information of the message necessary for transmission on the network 31. In addition, the message 91 will also include scheduling data 100 which may be physically attached to the message data 99 or associated with the message data 99 by the operating system 32.

The scheduling data 100 includes a user-assigned priority 96 generally indicating a high priority for messages associated with time critical tasks. The priority 96 is taken from the priority of the application program 34 of which the message 91 form a part and is determined prior to application program based on the importance of its control task as determined by the user.

The scheduling data 100 may also include a execution period (EP) indicating the length of time anticipated to be necessary to execute the message for transmission on the network 31 and a deadline period (DP) being in this case the portion of the completion timing constraint $t_1$ allocated to the particular communication card 28 for transmission of the message 91. The scheduling data 100 also includes a task identification (TID) identifying the particular message 91 to an application program 34 so that the high level requirements of the application program 34, imputed to the message 91 as will be described, may be determined from the application list 30 described above, and so that the resources and bandwidths allocated to the application program and its portion held in resource list 44 can be accessed by the communication card 28 and the scheduler 94.

The scheduling data 100 may be attached by the operating system 32 and in the simplest case is derived from data entered by the control system programmer. The execution period after entry, may be tracked by the operating system during run-time and modified based on that tracking to provide for accurate estimations of the execution period over time.

Upon arrival of a message at the communication card 28, the scheduling data 100 and the message data 99 are provided to the scheduler 94. The scheduler 94 notes the arrival time based on a system clock (not shown) and calculates a LATEST STARTING TIME for the message (LST) as equal to a deadline time minus the execution period. The deadline time is calculated as the message arrival time plus the deadline period provided in the message.

Figure 9:
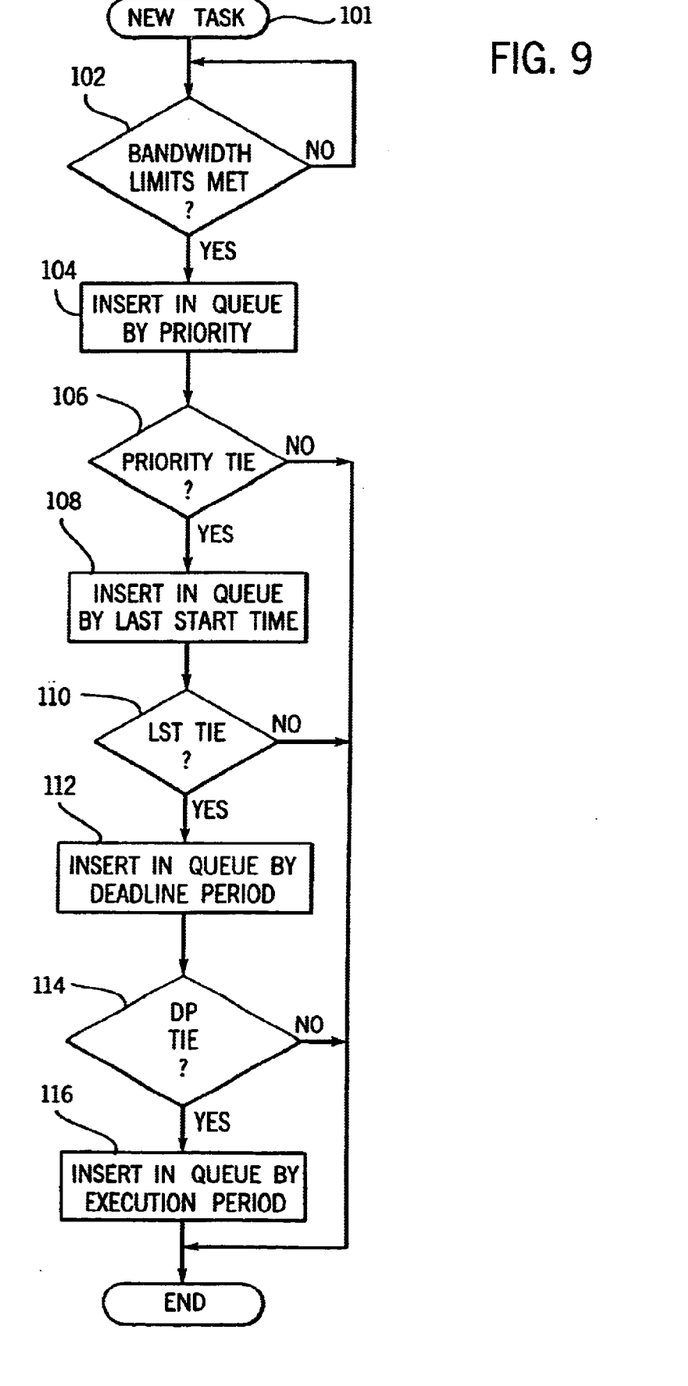
FIG. 9 is a flow chart showing the steps of operation of enrolling the message of FIG. 8a or tasks of FIG. 8b into a queue.

Referring now to FIG. 9, arrival of the message at the communication card 28 is indicated generally at process block 101 and is represented generally as a task, reflecting the fact that the same scheduling system may be used for other than messages as will be described below.

Following process block 101 is decision block 102 which determines whether the bandwidth limits for the task have been violated. The determination of bandwidth limits at block 102 considers, for example, the inter-arrival period $t_2$ for the messages 91. A message 91 will not be scheduled for transmission until the specified inter-arrival period $t_2$ expires for the previous transmission of the message 91. The expiration time of the inter-arrival period $t_2$ is stored in the history memory 98 identified to the TID of the message. This ensures that all guarantees for message execution can be honored. More generally for a task other than a message, the bandwidth limits may include processor time or memory allocations.

If at process block 102, there is no remaining allocation of network bandwidth for the particular task and the task is guaranteed, it is not executed until the bandwidth again becomes available.

At succeeding block 104, if the bandwidth limits have not been violated, the message is placed in the queue 90 according to its user priority 96. Thus, high priority messages always precedes low priority messages in the queue 90. The locking out of low priority messages is prevented by the fact that the high priority messages must have guaranteed bandwidths and a portion of the total bandwidth for each resource, the communication card 28, for example, is reserved for low priority tasks.

At decision block 106, it is determined whether there is a priority tie, meaning that there is another message 91 in the queue 90 with the same priority as the current message 91. If not, the current message 91 is enrolled in the queue 90 and its position need not be recalculated although its relative location in the queue 90 may change as additional messages are enrolled.

If at decision block 106 there is a priority tie, the scheduler 94 proceeds to process block 108 and the messages with identical priorities are examined to determine which has the earliest LATEST STARTING TIME. The LATEST STARTING TIME as described above is an absolute time value indicating when the task must be started. As described above the LATEST STARTING TIME need only be computed once and therefore doesn't cause unbounded numbers of context switches. The current message is placed in order among the message of a similar priority according to the LATEST STARTING TIME with earliest LATEST STARTING TIME first.

If at succeeding process block 110, there is no tie between the LATEST STARTING TIMES, then the enrollment process is complete. Otherwise, the scheduler 94 proceeds to process block 112 and the messages are examined to determine their deadline periods DP as contained in the scheduling data 100. A task with a shorter deadline period is accorded the higher priority in the queue 90 on the rationale that shorter deadline periods indicate relative urgency.

At succeeding process block 114 if there remains a tie according to the above criteria between messages 91, then at process block 116, the tie is broken according to the execution period, EP, of the messages 91. Here the rationale is that in the case of transient overload, executing the task with the shortest execution period will ensure execution of the greatest number of tasks.

A system clock with sufficient resolution will prevent a tie beyond this point by ensuring that the LATEST STARTING TIMES are highly distinct.

These steps of determining priority may be simplified by concatenating the relevant scheduling data 100 into a single binary value of sufficient length. The user priority forms the most significant bits of this value and execution period the least significant bits. This binary value may then be examined to place the messages (or tasks) in the queue 90.

As each message 91 rises to the top of the queue 90 for transmission, its LATEST STARTING TIME is examined to see if it has been satisfied. Failure of the task to execute in a timely fashion may be readily determined and reported.

Mixed Priority Multi-Tasking

Figure 8B:
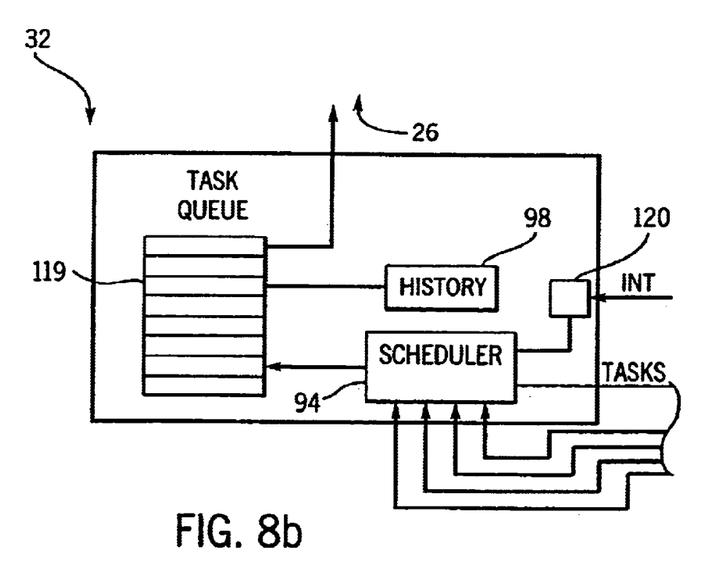
FIGS. 8b is a figure similar to that of FIG. 8a showing the scheduler of FIG. 8a as implemented for multi-tasking of the processors of FIG. 1.

As mentioned, the scheduling system used for the communication card 28 described above is equally applicable to scheduling other resources within the distributed operating system, for example, the processors 26. Referring to FIG. 8b, each processor 26 may be associated with a task queue 119 being substantially identical to the message queue 90 except that each slot in the task queue 119 may represent a particular bandwidth or time slice of processor usage. In this way, enrolling a task in the task list not only determines the order of execution but allocates a particular amount of processor resources to that task. New tasks are received again by a scheduler 94 retaining a history of the execution of the task according to task identification (TID) in memory 98 and enrolling the tasks in one of the time slots of the task queue 119 to be forwarded to the processor 26 at the appropriate moment. The tasks include similar tasks scheduling data as shown in FIG. 8a but need not include a message data 99 and may rely on the TID to identify the task implicitly without the need for copying the task into a message for actual transmission.

Referring to FIG. 9, the operation of the scheduler 94 as with the case of messages above, only allocates to the task the number of time slots in the queue 90 as was reserved in its bandwidth allocation in the resource list 44. In this way, it can be assured that time guarantees may be enforced by the operating system.

Interrupt Management

As is understood in the art, interrupts normally act directly on the processor 26 to cause the processor 26 to interrupt execution of a current task and to jump to an interrupt subroutine and execute that subroutine to completion before returning to the task that was interrupted. The interrupt process involves changing the value of the program counter to the interrupt vector and saving the necessary stack and registers to allow resumption of the interrupt routine upon completion. Typically interrupt signals may be masked by software instructions such as may be utilized by the operating system in realizing the mechanism to be described now.

Referring now to FIGS. 8a and 8b, a similar problem to that described above, of lower priority messages blocking the execution of higher priority messages in the message queue 90, may occur with interrupts. For example, a system may be executing a time critical user task when a low priority interrupt, such as that which may occur upon receipt of low priority messages, may occur. Since interrupts are serviced implicitly at a high priority level, the interrupt effects a priority inversion with the high priority task waiting for the low priority task. If many interrupts occur, the high priority tasks may miss its time guarantee.

This problem may be solved in two ways. Referring to FIG. 8a upon a receipt of a message from network 31 and particularly those associated with remote operating system services, an interrupt 118 may be generated and passed to a task generator 120 shown in FIG. 8b. The task generator 120 which receives the interrupt generates a proxy task forwarded to the scheduler 94. The proxy task assumes the scheduling data 100 of the message causing the interrupt and is subject to the same mixed processing as the tasks described above via the scheduler 94. Depending on its priority and other scheduling data 100, the proxy task may preempt the current task or might wait its turn. This procedure guarantees deterministic packet reception without affecting tasks on the receiving node adversely.

Figure 10:
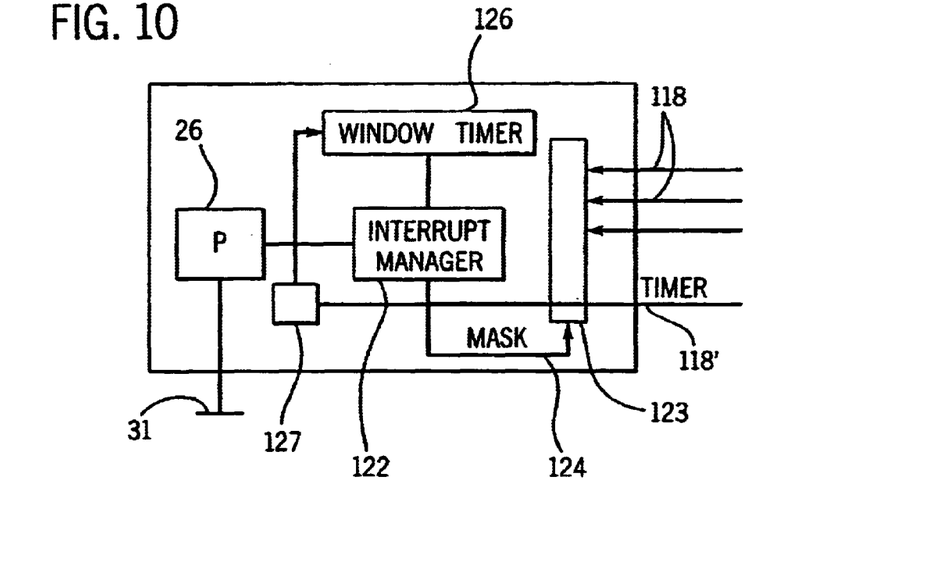
FIG. 10 is a schematic representation of the interrupt handling system provided by the operating system and processor of FIGS. 1 and 2.

Referring now to FIG. 10 in an alternate form of interrupt management, interrupts 118 from general sources such as communication ports and other external devices are received by an interrupt manager 122 prior to invoking the interrupt hardware on the processor 26. One exception to this is the timer interrupt 118' which provides a regular timer "click" for the system clock which, as described above, is used by the scheduler 94. The interrupt manager 122 provides a masking line 124 to a interrupt storage register 123, the masking line allowing the interrupt manager 122 to mask or block other interrupts (while storing them for later acceptance) and communicates with an interrupt window counter 126 which is periodically reset by a clock 127.

Generally, the interrupt manager 122, its masking line 124, the interrupt storage register 123, the interrupt window counter 126 and the window timer are realized by the operating system 32 but as will be understood in the art may also be implemented by discrete circuitry such as an application specific integrated circuit (ASIC).

Figure 11:
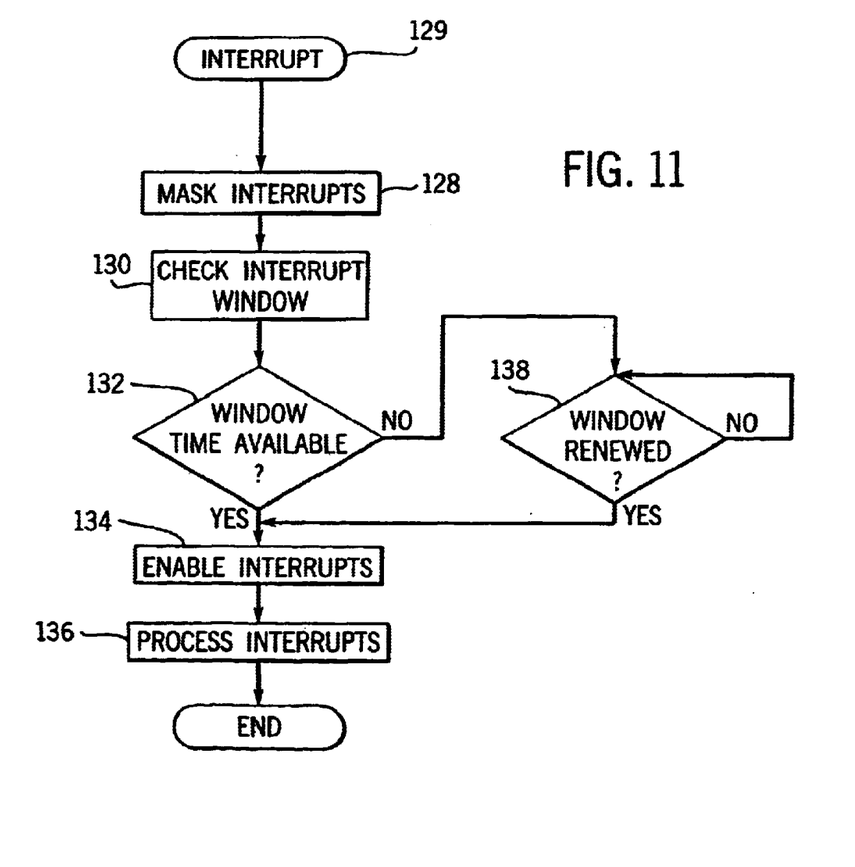
FIG. 11 is a flow chart showing the steps of operation of the interrupt handling system of FIG. 10.

Referring to FIG. 11, the interrupt manager 122 operates so that upon the occurrence of an interrupt as indicated by process block 129, all further interrupts are masked as indicated by process block 128. The interrupt window counter 126 is then checked to see if a pre-allocated window of time for processing interrupts (the interrupt window) has been exhausted. The interrupt window is a percentage of processing time or bandwidth of processor 26 reserved for interrupts and its exact value will depend on a number of variables such as processor speed, the number of external interrupts expected and how long interrupts take to be serviced and is selected by the control system programmer. In the allocation of processor resources described above, the interrupt period is subtracted out prior to allocation to the various application programs. The interrupt window counter 126 is reset to its full value on a periodic basis by the clock 127 so as to implement the appropriate percentage of processing time.

At process block 130, after the masking of the interrupts at process block 128, the interrupt window counter 126 is checked to see if the amount of remaining interrupt window is sufficient to allow processing of the current interrupt based on its expected execution period. The execution periods may be entered by the control system programmer and keyed to the interrupt type and number. If sufficient time remains in the interrupt window, the execution period is subtracted from the interrupt window and, as determined by decision block 132, then the interrupt manager 122 proceeds to process block 134. At process block 134 the interrupts 118 are re-enabled via masking line 124 and at process block 136, the current interrupt is processed. The time taken to process the interrupts monitored and at its conclusion the interrupt window is corrected by adding the estimated execution period and subtracting the actual monitored execution period.

By re-enabling the interrupts at process block 134, nested interrupts may occur which may also be subject to the processing described with respect to process block 129. Nested interrupting is possible because prior to each nested interrupt, the estimated execution period will be cleared against the interrupt window.

If at decision block 132, there is inadequate time left in the interrupt window, then the interrupt manager 122 proceeds to decision block 138 where it remains until the interrupt window is reset by the clock 127. At that time, process blocks 134 and 136 may be executed.

As mentioned, the interrupt window is subtracted from the bandwidth of the processor 26 that may be allocated to user tasks and therefore the allocation of bandwidth for guaranteeing the execution of user tasks is done under the assumption that the full interrupt window will be used by interrupts taking the highest priority. In this way, interrupts may be executed within the interrupt window without affecting guarantees for task execution.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. An interrupt manager for use with a processor in a distributed control system, the interrupt manager comprising:

(a) interrupt reception circuitry receiving interrupt signals including a current interrupt;

(b) an interrupt window counter storing an interrupt window indicating time available for processing of interrupts;

(c) a timer refreshing the interrupt window counter at expiration of a window period; and (e) a masking circuit masking a current interrupt when the interrupt window counter indicates that the processing of the current interrupt would exceed the interrupt window in the current window period.

2. The interrupt manager of claim 1 wherein the interrupt reception circuitry allows masking of interrupts and wherein the interrupt manager upon receiving the interrupt signal masks further interrupts until it is determined that the processing of the current interrupt would not exceed the interrupt window in the current window period.

3. The interrupt manager of claim 1 wherein the interrupt manager provides an estimate of the time needed for processing the current interrupt and uses this estimate to change the value of the interrupt window when the interrupt window indicates that the processing of the current interrupt would not exceed the interrupt window.

4. The interrupt manager of claim 1 wherein the interrupt manager ceases masking the current interrupt upon the resetting of the interrupt window counter by the timer.

5. The interrupt manger of claim 1 including further a resource allocating operating system pre-allocating portions of the window period, excluding the maximum interrupt window to multiple tasks to be executed on the processor so as to guarantee timely execution of those tasks.

6. The interrupt manager of claim 1 wherein the interrupt manager determines whether the processing of the current interrupt would exceed the interrupt window of the current window period by subtracting an estimate of the interrupt processing time from the interrupt window.

7. The interrupt manager of claim 6 wherein the interrupt manager further monitors the execution of the current interrupt and modifies the estimate of the interrupt processing time according the monitoring;

whereby the interrupt processing time is more accurately determined.

8. The interrupt manager of claim 6 wherein upon completion of the current interrupt, the interrupt manager adds the estimate of the interrupt processing time to the interrupt window and subtracts an actual interrupt processing time from the value of the interrupt window;

whereby later estimates of the interrupt window are more accurate.

9. An interrupt manager for use with a processor in a distributed control system, the interrupt manager comprising:

(a) a task scheduler receiving tasks and arranging tasks in a queue according to priorities for execution by the processor;

(b) a communication circuit receiving messages having a priority to generate a communications interrupt; and (c) an interrupt reception circuit communicating with the task scheduler and the communication circuit to receive communication interrupts and to generate corresponding proxy tasks sent to the task scheduler, the proxy task when executed by the processor causing the communication interrupt to be processed as a task, the proxy tasks having the priority of the message associated with their communication interrupt.

10. The interrupt manager of claim 9 wherein the message priority includes a user assigned priority and a time constraint value and wherein the interrupt reception circuit generates a proxy task having both the user assigned priority and the time constraint value task scheduler.

11. The interrupt manager of claim 10 wherein the task scheduler schedules the task in an order that depends on both the user assigned priority and the time constraint value.

* * * * *